United States Patent
Rusnak

(10) Patent No.: US 10,017,647 B2
(45) Date of Patent: Jul. 10, 2018

(54) MATERIAL FOR SURFACE TREATMENT CONTAINING HOLLOW GLASS BODIES AND SILICA, AND ITS APPLICATION

(71) Applicant: Helske Limited, London (GB)

(72) Inventor: Matej Rusnak, Slovakia (SK)

(73) Assignee: HEISKE Limited, London (GB)

( * ) Notice: Subject to any disclaimer, the term of this patent is extended or adjusted under 35 U.S.C. 154(b) by 81 days.

(21) Appl. No.: 14/767,065

(22) PCT Filed: Dec. 30, 2013

(86) PCT No.: PCT/IB2013/061411
§ 371 (c)(1),
(2) Date: Aug. 11, 2015

(87) PCT Pub. No.: WO2014/102753
PCT Pub. Date: Jul. 3, 2014

(65) Prior Publication Data
US 2016/0032108 A1   Feb. 4, 2016

(30) Foreign Application Priority Data
Dec. 31, 2012   (SK) .............................. 50122-2012 U

(51) Int. Cl.
*B32B 18/00* (2006.01)
*C09D 5/00* (2006.01)
(Continued)

(52) U.S. Cl.
CPC ................. *C09D 5/00* (2013.01); *B05D 5/08* (2013.01); *C09D 5/004* (2013.01); *C09D 7/67* (2018.01);
(Continued)

(58) Field of Classification Search
USPC ............. 428/212, 307.3, 312.2, 312.6, 316.6
See application file for complete search history.

(56) References Cited

U.S. PATENT DOCUMENTS 3,904,377 A * 9/1975 Honda .................... C04B 14/16
                                                      428/539.5
5,641,548 A * 6/1997 Yamamoto .......... B29C 49/0005
                                                      264/512
2010/0040881 A1   2/2010 Beck

FOREIGN PATENT DOCUMENTS

CA   1171573   7/1984
CN   101768400   7/2010
(Continued)

*Primary Examiner* — Hoa (Holly) Le
(74) *Attorney, Agent, or Firm* — Defillo & Associates, Inc.; Evelyn A Defillo

(57) ABSTRACT

Material for surface treatment, mainly with thermo-reflexive and/or thermoinsulative characteristics, and with high water resistance level, contains first hollow glass bodies (1) with size fraction ranging from 65 to 110 μm, second, filler hollow glass bodies (2) intended to fill the spaces within main fraction of the bodies (1) and these second, filler hollowed glass bodies (2) have size fraction ranging from 30 to 105 μm, it also contains silicon dioxide processed to form of the nanoparticles and a binder (3). Hollow glass bodies (1, 2) will be mainly shaped as hollow, vacuumed microballs. A mixture forming the material can contain hollow glass bodies (1) making up 3 to 30% of its mass, filler hollow glass bodies making up 3 to 15% of its mass and silicon dioxide making up 1 to 17% of its mass. The material for surface treatment is health friendly, it can be used especially on the house façades and in industry, where it is applied on the surface (4), the heath transfer and incandescence of which is to be diminished.

15 Claims, 2 Drawing Sheets

(51) Int. Cl.

| | |
|---|---|
| *C09D 5/33* | (2006.01) |
| *C09D 101/28* | (2006.01) |
| *C09D 133/00* | (2006.01) |
| *B05D 5/08* | (2006.01) |
| *C09D 7/40* | (2018.01) |
| *C08K 3/36* | (2006.01) |
| *C08K 7/22* | (2006.01) |
| *C08K 7/28* | (2006.01) |

(52) U.S. Cl.
CPC ................ *C09D 7/68* (2018.01); *C09D 7/69* (2018.01); *C09D 7/70* (2018.01); *C09D 101/28* (2013.01); *C09D 101/284* (2013.01); *C09D 101/286* (2013.01); *C09D 133/00* (2013.01); *C08K 3/36* (2013.01); *C08K 7/22* (2013.01); *C08K 7/28* (2013.01)

(56) References Cited

FOREIGN PATENT DOCUMENTS

| | | |
|---|---|---|
| CN | 101857768 | 10/2010 |
| CN | 102229772 | 11/2011 |
| CN | 102304966 | 1/2012 |
| CN | 102391757 | 3/2012 |
| CN | 102518220 | 6/2012 |
| CN | 202302360 | 7/2012 |
| CN | 102690559 | 9/2012 |
| KR | 20090002459 | 1/2009 |
| KR | 20100049348 | 5/2010 |

\* cited by examiner

MATERIAL FOR SURFACE TREATMENT CONTAINING HOLLOW GLASS BODIES AND SILICA, AND ITS APPLICATION

CROSS REFERENCE TO RELATED APPLICATION

This application is a national stage entry of PCT/IB2013/061411 filed Dec. 30, 2013, under the International Convention claiming priority over Slovakian Patent Application No. PUV 50122-2012 filed Dec. 31, 2012.

FIELD OF THE INVENTION

The invention concerns a material for surface treatment that can be used especially as thermo-reflexive, thermoinsulative, surface water resistant coating that has significant results when applied in thin layer already. The material can be used as a finishing plaster mixture in construction of inner and outer surfaces in objects and buildings and it can also be universally applied in industry and technology, where it prevents heat dissipation. The material can be used in places with long-term excessive moisture.

STATE OF ART

A number of known methods and materials are used for inner and outer insulation of objects. Majority of objects is insulated by polystyrene or mineral wool; various foam materials are used, too.

The disadvantage of the polystyrene is that it is not diffusive and that it lacks a continual contact with the walling. This can result in precipitation of water between the polystyrene and the wall and creation of molds that can gradually permeate the interior of an object. Insulation by insulation plates is temporally and economically demanding, it is not ecological and it is unacceptable in cases of historical buildings.

If coefficient of the thermal conductivity λ is given, the effect of insulation is dependent mainly on the thickness of the insulation. Because of this the classical insulations cannot be used where the space for their application is lacking. In technical practice it is often necessary to shade the incandescence away from hot surfaces in places where insulation by use of insulation plates is not possible at all.

Another form of thermoinsulative coating material is known; it contains small thermo-reflexive bodies such as hollow glass balls. In case of an application of such material it is not necessary to linearly increase the thickness of the layer, because part of the incandescence is reflected by the thermo-reflexive bodies. These are usually small. Based on this principle, numerous applications are known, for example CN202302360, CN10235923, KR20090002459, KR20100049348, CA1171573 and US2010040881. All the known mixtures of thermo-reflexive bodies with various fillers and binders are usually designed for a particular use; their application is rigid and they contain economically and energetically demanding mixtures.

A solution of material for surface treatment that would be easily applicable on any surface, that would be highly water resistant, that would have best thermo-reflexive and thermoinsulant characteristics even if applied in thin layer, and that would be producible at low costs, is currently desired, but it is not known.

SUMMARY OF THE INVENTION

The abovementioned deficiencies are significantly remedied by the material for surface treatment with, mainly, thermo-reflexive and/or thermoinsulative characteristics, where the material contains hollow glass bodies, a binder and the water according to this invention. The essence of this invention is that the material is made of mixture that contains:
first glass hollow bodies with main size fraction ranging from 65 to 110 μm,
second, filler hollow glass bodies are used to fill the spaces in main fraction of the first bodies; these second hollow glass bodies have size fraction ranging from 30 to 105 μm,
the silicon dioxide that is processed into the form of nanoparticles.

Usage of two different fractions of hollow bodies increases the thermo-reflexive and thermoinsulative characteristics of the material in a given applied layer. Even though the abovementioned fractions partially overlap in their sizes, in simple statistical distribution of the sizes of the bodies the filler fraction has smaller size of the hollow bodies and it properly increases the saturation of the material. The peaks of statistical distribution of the sizes of the bodies (for example according to Gauss curve $$g(x) = \frac{1}{\sigma\sqrt{2\pi}} e^{\frac{-(x-E(x))^2}{2\sigma^2}} )$$

in common industrial production or in sorting of the bodies, respectively, will correspond to density of the normal distribution of probability. Even if we consider the curves with different derivation run, the two originally separated fractions will have, in principle, their peaks of density at different sizes, that is, at different points of the x axis. They can have different peaks on the y axis, too. The difference between the positions of peaks of density on x axis is at least 20 μm, more preferably at least 30 μm. In such an arrangement the mixture of two fractions will have, as it were, two independent peaks of the density of distribution. In case of abovementioned fractions significantly good results are achieved even if small layer of the material is applied. In a favorable arrangement the main size fraction can range from 80 to 110 μm and the second, filler size fraction can range from 30 to 80 μm; in an especially favorable arrangement the main size fraction can range from 85 to 110 μm and the second, filler size fraction can range from 50 to 75 μm. It has been found that the usage of two different fractions in one mixture according to this invention has much better effects than usage of the different fractions in two different layers with identical overall thickness, or usage of one fraction with respective upper and lower size limit (for example one fraction ranging from 30 to 110 μm).

It is preferable to have hollow glass bodies of main and/or filler fraction at least partially vacuumed, or at least filled with an inert gas. Commonly, the hollow bodies will mainly have form of hollow microballs, but an exact geometric shape of bodies is not decisive. Hollow glass bodies reflect and diffuse infrared incandescence.

Silicon dioxide in form of nanoparticles is also known as nanoglass or liquid glass. It is currently used as a protection coating to prevent surfaces from dirt, graffiti, etc. Silicon dioxide processed into the form of nanoparticles is optically neutral and has no effect on the color of the material, which is important in the aesthetically demanding applications such as applications on the coating of the buildings. It is also UV stable and it can withstand temperatures up to 480° C.; it prevents the growth of mold and fungi. In the particular mixture according to this invention the silicon dioxide (especially in form of the silica sand) has perfect adhesion to hollow glass bodies and it ensures the material a high level of surface water resistance. At the same time the material is vapor permeable and diffusively open.

Silicon dioxide will have, in favorable arrangement, a form of an amorphous powder with fraction less than 5 μm, preferrably less than 1 μm. Such fraction of amorphous powder silicon dioxide has high specific surface values, commonly ranging from 12 000 to 35 000 m²/kg. Similar fraction of an ultra-smooth silica fume is used for refinement of the concrete and is called microsilica. Silicon dioxide powder is nonflammable and its melting point is approximately 1.600° C. It is widely known that crystalline silicon can cause silicosis; however, in the mixture according to this invention the amorphous silicon dioxide is used, and this one is not considered dangerous.

In a favorable arrangement the mixture will be water-based and it will include stabilizers, additives and tinction, too. Acrylic resin or cellulose derivative in the water acrylic dispersion or hydroxyethyl cellulose or methylcellulose or methyl hydroxyethyl cellulose or ethyl hydroxyethyl cellulose or hydroxypropyl cellulose or carboxymethylcellulose or carboxymethyl hydroxyethyl cellulose can be used as binders. In different arrangement the binder can be created on the basis of inorganic bentonite or synthetic polymer or it can have cement of nitrocellulose basis.

In order to achieve fine utility features it is preferable that 3 to 30% of the mass of the mixture is made up by the hollow glass bodies with fraction ranging from 65 to 110 μm, that the spaces between them are filled with filler hollow glass bodies with fraction ranging from 30 to 105 μm that make up 3 to 15% of the mass of the mixture, that the silica sand processed into the form of nanoparticles makes up 1 to 17% of the mass of the mixture, that binder makes up from 1 to 43% of the mass of the mixture, that stabilizers make up to 10% of the mass of the mixture, that other additives make up to 10% of the mass of the mixture and that water makes up from 3 to 45% of the mass of the mixture.

Thanks to the abovementioned composition of the mixture we get the material suitable for the application both in construction and in industry in general where it is difficult or ineffective to use classical thick-layered insulation materials to separate the heat from cold. Thanks to the usage of hollow glass bodies and liquid nanoglass in the mixture the material is set to achieve the insulation and anti-condensation effect.

When mixing the material for surface treatment it will be preferable if second, filler hollow glass bodies are added into the mixture only after the first hollow glass bodies are mixed up with the binder, silicon dioxide and other additives, respectively. It has been found that using this approach the smaller, filler hollow glass bodies do not group together and around each other, but that they are better distributed into the spaces between first hollow glass bodies.

We can dilute the material with water, which is especially suitable for construction application, where the mixture is spreaded by smoothing, paint roller, coating, spraying by low pressure spray gun, and so on. In principle we can use different basis than water, that is, different dissolvent (alcohol, synthetic substances, etc.). The material can be spreaded by dipping, powder deposition or other means, too.

The mixture can contain colorings mixed into the binder, which ensures the whole-volume color of the material.

The material according to this invention can be used both outdoors and indoors and it is health friendly. The material will be used especially on the house façades, in the aviation industry, ship industry, refrigeration industry, air conditioning technology, car industry and basically everywhere the water resistant insulative and reflexive layer is needed. The material will be spreaded in layers at least of 0.4 to 2 mm thick, preferably 0.7 to 1.1 mm thick.

BRIEF DESCRIPTION OF THE DRAWINGS

The invention is specified by FIGS. 1 to 4. Sizes and size ratios of the hollow bodies, as well as their shape, is schematic and illustrative, so it is not possible to interpret the drawings as limiting the scope of protection.

EXAMPLES OF REALIZATION

Example 1

Figure 1:
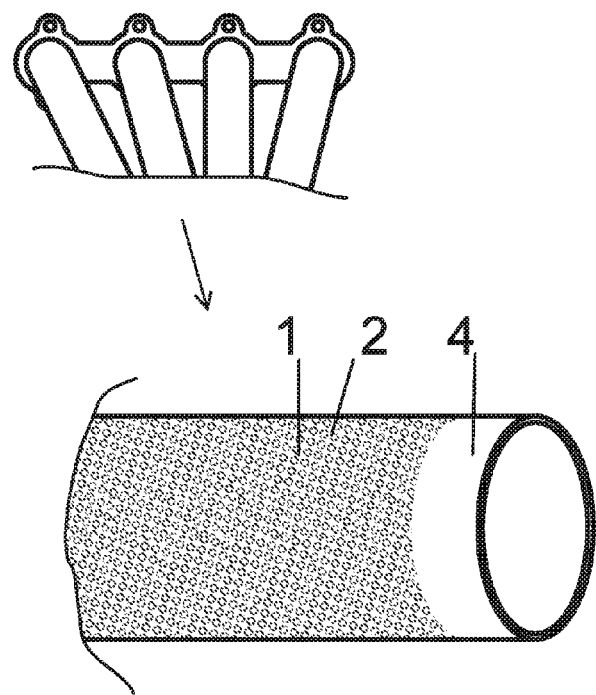
FIG. 1 is a detail of one spreaded layer on the metal tube of the exhaust pipe.
Figure 2:
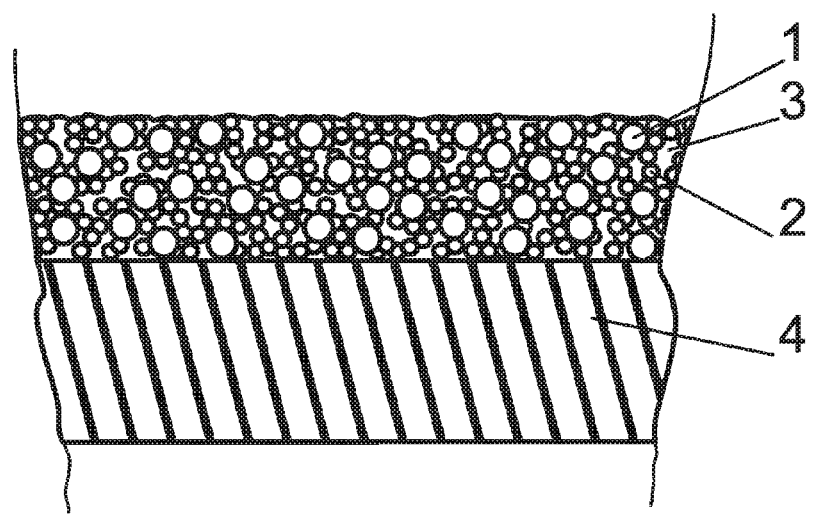
FIG. 2 is a cross-section of the layer spreaded on the metal surface.
Figure 3:
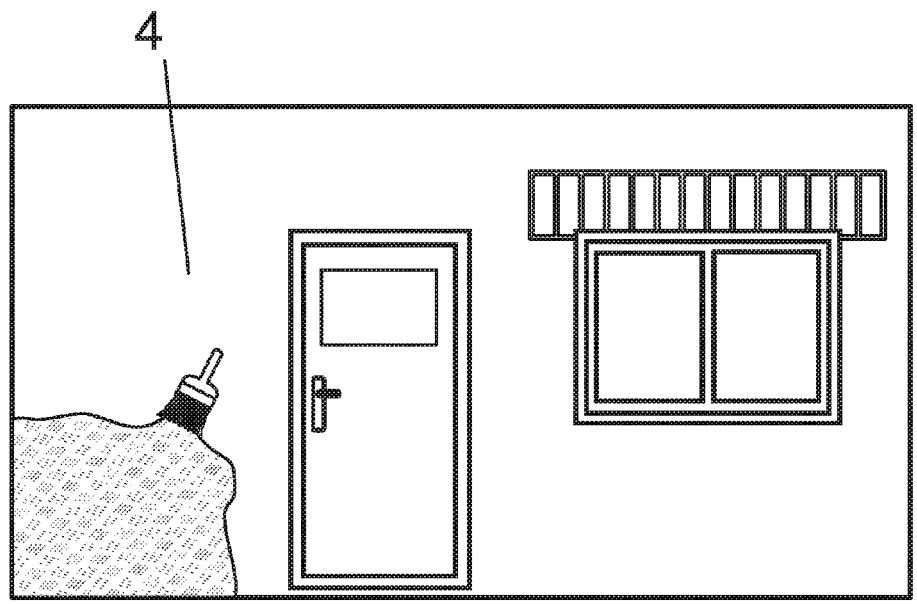
FIG. 3 represents an application of the material on the building surface in form of the final layer of repainted plaster mixture.
Figure 4:
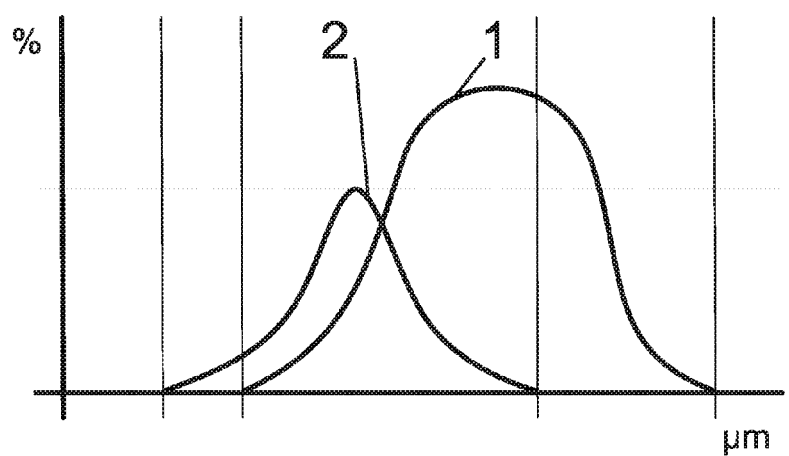
FIG. 4 is an example of statistical distribution of the sizes of the bodies in both the main and the filler fraction.

In this example according to drawings 3 and 4 the material is used as the final surface layer of the plaster. The mixture consists of the hollow glass bodies 1 of the main fraction (65 to 110 μm) that make up 20% of its mass and of the hollow glass bodies 2 of the filler fraction (30 to 105 μm) filling out the spaces in between that make up 10% of the mixture's mass. In this example the hollow glass bodies 1 and 2 of both fractions are in the form of microballs that are vacuumed inside. The mixture also contains liquid glass, that is, silicon dioxide in the form of nanoparticles, that makes up 7% of its mass, cellulose derivative functioning as a binder 3 that makes up 10% of the mixture's mass and the water acrylic dispersion that makes up 14% of its mass. The mixture according to this example contains sodium hydroxide that makes up 4% of its mass and finely ground limestone making up 8% of its mass. The rest of the mixture is made up of water.

The mixture is processed into paste by mixing powdered colorant into it, and can be subsequently spreaded on the surface 4 by, for example, spatula in layer of 0.8 to 1 mm; the surface being the surface of walling, metal, wood, glass or plastic.

Example 2

In this example according to drawings 1 and 4 the material is set for use on metal surface 4 of the tube of the exhaust pipe with the intention to achieve a reduced incandescence onto the surrounding components of internal combustion engine. By spreading the layer of 1.2 mm we also increase temperature of the flue gases entering the catalytic converter. The layer is resistant to high temperatures, it is nonflammable and does not excrete any toxic substances both during spreading and the service; it does not influence the accuracy of the measuring of the lambda probe.

The mixture that makes up the material is composed of hollow glass bodies 1 with fraction ranging from 85 to 100 μm that make up 25% of its mass, of filler hollow glass bodies with fraction ranging from 50 to 75 μm that make up 15% of its mass and of silicon dioxide in the form of nanoparticles that makes up 15% of the mixture's mass. The material is applied by dipping the blinded tube to the bath with the mixture.

Example 3

The material for surface treatment is used as an insulative layer on the cooling equipment. Two different fractions of the hollow glass bodies 1 and filler hollow glass bodies 2 are selected so the peaks of the fraction distribution within the fraction intervals are as remote as possible. This contributes to increase of the adhesion and high flexibility that is needed for continuously loaded and vibrant surface 4. The peak of the main fraction is approximately at 95 μm, the peak of the filler fraction is approximately at 50 μm. The mixture contains silicon dioxide in the form of nanoparticles that makes up 12% of its mass. The material is spreaded by spraying the mixture onto the preheated pipes. The pipes are cut, bent and ended only after the insulative layer is applied. In another example the material can be applied on the inner side of the insulated object, for example on the inner side of the boiler for heating the water. Boiler's surface can be treated from outside as well.

Example 4

In this example the material for surface treatment is part of a dry plaster mixture for indoors or outdoors use. The mixture once again contains two fractions with remote peaks of distribution according to their size. The dry mixture is diluted and mixed with water only just before the application. The mixture can contain the cement based binder. The diluted mixture is spreaded by a metal spatula in the layer of approximately 1 mm. Applied plaster mixture creates a vapor permeable membrane. This membrane is resistant to the extreme weather conditions, too. Thanks to the inclusion of silicon components the material prevents the formation of a moisture, mosses and molds. The membrane also prevents outside water from permeating the plaster. Surface water swiftly vaporizes thanks to the large surface of hollow glass bodies.

INDUSTRIAL APPLICABILITY

The industrial applicability is obvious. It is possible, according to this invention, to industrially and repeatedly produce the thermo-reflexive, thermoinsulative, surface water resistant material for surface treatment, mainly as a finishing plaster mixture in construction of inner and outer surfaces in objects and buildings, which can be also universally applied in industry and technology.

LIST OF RELATED SYMBOLS

1—hollow glass bodies of the main fraction
2—filler hollow glass bodies
3—binder
4—surface

The invention claimed is:

1. A material for a surface treatment having thermo-reflexive and/or thermoinsulative characteristics, the material comprising:
    a mixture including:
    a first set of hollow glass bodies;
    a second set of hollow glass bodies;
    a silicon dioxide processed to form nanoparticles,
    a binder;
    the first set of hollow glass bodies having a form of hollow micro balls and a size ranging from 65 to 110 μm;
    the second filler hollow glass bodies having a form of hollow micro balls and having a size ranging from 30 to 105 μm, the second set of hollow glass bodies fill spaces within the first set of hollow glass bodies;
    wherein a difference in particle diameter of a peak of the particle size distribution between the first set of hollow glass bodies and the second set of hollow glass bodies is at least 20 μm.

2. The material according to claim 1, wherein a difference in particle diameter of a peak of the particle size distribution between the first set of hollow glass bodies and the second set of hollow glass bodies is at least 30 μm.

3. The material for surface treatment according to claim 1, wherein the mixture contains water in an amount ranging from 3 to 45% of the mass of the mixture.

4. The material for surface treatment according to claim 1, wherein the first set of hollow glass bodies and/or the second set of hollow glass bodies are at least partially vacuumed or at least partially filled with an inert gas.

5. The material for surface treatment according to claim 1, wherein the mixture contains first hollow glass bodies in the ratio of 3 to 30% of the mass of the mixture, the second filler hollow glass bodies in the ratio of 3 to 15% of the mass of the mixture and silicon dioxide in the form of silica sand, in the ratio of 1 to 17% of the mass of the mixture.

6. The material for surface treatment according to claim 1, wherein the binder is in a ratio of 1 to 43% of the mass of the mixture.

7. The material for surface treatment according to claim 6, wherein the binder is selected from the group consisting of acrylic resin, cellulose derivative in the water acrylic dispersion, hydroxyethyl cellulose, methylcellulose, methyl hydroxyethyl cellulose, ethyl hydroxyethyl cellulose, hydroxypropyl cellulose, carboxymethylcellulose, and carboxymethyl hydroxyethyl cellulose.

8. The material for surface treatment according to claim 6, wherein the binder is an inorganic bentonite or synthetic polymer.

9. The material for surface treatment according to claim 1, wherein the mixture further includes stabilizers and/or other additives in the ratio up to 20% of the mass of the mixture.

10. The material for surface treatment according to claim 1, wherein the material is colored by a coloring agent mixed into the binder or into an additive.

11. A method of mixing the mixture for production of the material for surface treatment according to claim 1, comprising the steps of:
    adding the second filler hollow glass bodies into the mixture only after the first hollow glass bodies are mixed up with the binder and the silicon dioxide.

12. A method of producing a thermo-reflexive and/or a thermoinsulative surface treatment to a construction object by applying the material according to claim 1, to an indoor or outdoor plaster for the construction object.

13. The method according to claim 12, wherein the material is in form of an insulation layer spread on an outer or an inner surface of the object.

14. The method according to claim 12, wherein the material is spread in the layer of the thickness ranging from 0.4 to 2 mm.

15. The method according to claim 12, wherein the material is spread by coating and/or spraying and/or dipping and/or smoothing and/or painting.

* * * * *